(No Model.)

C. A. RAGGIO.
BUNG.

No. 435,713. Patented Sept. 2, 1890.

Witnesses
Timothy Stebbins
L. W. Bender

Inventor
Charles A. Raggio
By his Attorney Wm. Zimmerman

UNITED STATES PATENT OFFICE.

CHARLES A. RAGGIO, OF CHICAGO, ILLINOIS.

BUNG.

SPECIFICATION forming part of Letters Patent No. 435,713, dated September 2, 1890.

Application filed May 27, 1890. Serial No. 353,386. (No model.)

*To all whom it may concern:*

Be it known that I, CHARLES A. RAGGIO, a citizen of the United States, residing at Chicago, in the county of Cook and State of Illinois, have invented certain new and useful Improvements in Barrel-Bungs, which are fully set forth in the following specification, reference being had to the accompanying drawings, forming a part hereof, and in which—

Figure 1:
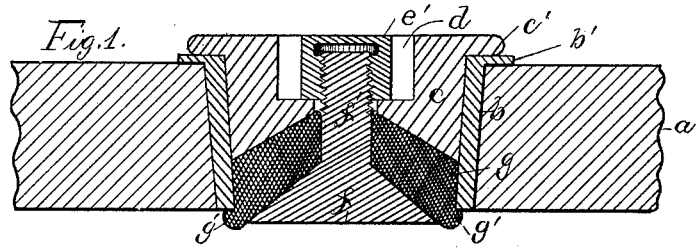
Figure 2:
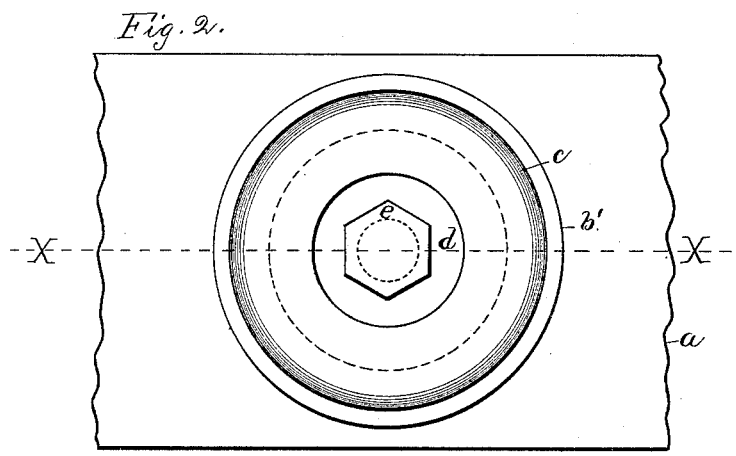
Figure 3:
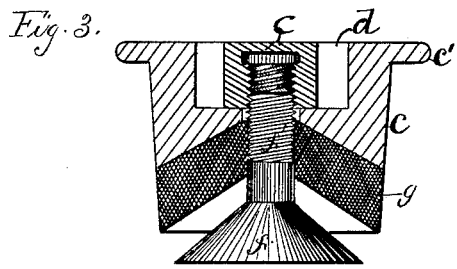

Figure 1 is a vertical central section taken on the plane $x$ $x$ of Fig. 2. Fig. 2 shows my device, in plan view, in a bung-bushing and fragment of a barrel. Fig. 3 shows my device, partly in section, open and ready to be placed into a bung-hole or bung-bushing.

Like letters refer to like parts.

The object of my invention is to produce a bung which may be easily and readily inserted and removed and which, when in place, shall in the act of fastening automatically expand and close all chances for leakage and also become more secure against displacement than an ordinary expanding bung; and to attain said ends I construct my improved bung in substantially the following manner, namely:

Into the bung-hole in the barrel $a$, or, preferably, into a bushing $b$ $b'$ in said barrel, I fit my device, which consists of a cylindrical or slightly conical plug $c$, provided with an exterior flange $c'$ and a central cavity or recess $d$, in the center of the bottom of which is a hole through which passes a pin $f'$, which is screw-threaded at its upper end and which forms an extension of the point of a cone $f$, the base of which said cone is somewhat less in diameter than that of the bushing or hole it enters. The plug $c$ is chambered on its base in form or manner corresponding to that of the cone $f$, or nearly so—that is to say, if the cone $f$ were brought in contact with the plug $c$ the parts would touch over their entire surfaces, if they were exactly parallel. Preferably, however, the conical cavity in the bottom of the plug $c$ is made flatter than the cone $f$, thus leaving a wedge-shaped space between them when in contact, of which the base is on the outer circumference. By this arrangement of said surfaces the upper surface of the rubber is forced inward around the pin $f'$ to tighten that joint, and at the same time the greater bulk of the elastic member $g$ is forced outward against the walls of the hole, like a receding wedge between two compressing-surfaces. Between said bodies $f$ and $c$ is placed a piece of rubber $g$, large enough in length to pass slightly below the inner end of the bushing $b$. The plug $c$ fits the bushing $b$ closely, but loosely, and may, therefore, be readily removed and replaced. The rubber part $g$ also passes into the hole with but slight friction.

To place my device into a bung-hole, the nut $e$ is raised to near the end of the pin $f'$, and is then pushed down on the base of the recess $d$ and thus separates the cone $f$ from the rubber $g$, as shown in Fig. 3. When the plug $c$ is in place, as shown in Fig. 1, the nut $e$ is turned so as to draw up the stem $f'$. This causes the cone to press upon the under and conical depression or cavity of the rubber $g$, and thus the said body is compressed between the base of the plug $c$ and the sides of the cone $f$. This pressure causes it to expand both inward against the pin $f'$ and outward against the inside walls of bushing $b$, thus making said closure both gas and water tight. That portion of the rubber $g$ which projects beyond the bushing $b$ forms, through said compression and the form of the parts $c$ and $f$, a bead $g'$ on the end of said bushing, which thus still more effectually closes the joint between the parts against all chances of leakage and at the same time forms a still stronger hold of my bung in its place, and thus making it so secure that it becomes practically impossible to remove my bung from its hole without destroying it. When the nut is loosened, as shown in Fig. 3, it may, however, be removed either by the bare hand or by the help of some simple apparatus.

By chambering the plug $c$ the top of the nut $e$ is sunk until flush or below the surface of the plug $c$, and therefore housed and secured against accidental injury; and owing to its form it may readily be cast and used without further work upon it. The same may be said of the other metal member, except that a thread to fit the nut must be cut, thus producing an article at a very low cost.

It may also, and further, be observed that the conical shape of both of said members which bear upon the ends of the rubber section tends particularly to form the bead $g'$, which, as before observed, both secures the closed bung against removal by any pressure from the interior of the cask and also to close the joint more tightly.

What I claim is—

1. In a bung, the cone $f$, with threaded pin $f'$, in combination with the nut $e$ on pin $f'$ and metal plug $c$, with vertical walls adapted to fit the bung-hole throughout its length, provided with exterior chamber $d$, having a hole through the center of its bottom adapted to receive said pin $f'$, an interior conical recess, and an expansible elastic body $g$ between said cone and plug adapted to operate substantially as specified.

2. In a bung, a metal plug $c$, with vertical walls adapted to fit the bung-hole throughout its length, provided with a flange $c'$, and a chamber $d$, entering exteriorly, in combination with a cone $f$, provided with a threaded pin $f'$, a nut $e$ on pin $f'$, and an elastic body $g$ between said cone and plug adapted to expand, substantially as specified.

3. In a bung, a metal plug $c$, with vertical walls adapted to fit the bung-hole throughout its length, with an exterior chamber $d$, having a hole through the center of its bottom and its opposite or bottom end provided with a conical recess, in combination with a cone $f$, having a threaded stem $f'$, an elastic body $g$, and nut $e$ on pin $f'$, adapted to compress said body $g$, substantially as specified.

4. In a bung, a metal plug $c$, with vertical walls adapted to fit the bung-hole throughout its length, with an exterior chamber $d$, having a hole through the center of its bottom, in combination with a cone $f$, provided with a threaded stem $f'$, nut $e$ on pin $f'$, and elastic body $g$, adapted to form, when compressed, the bead $g'$, substantially as specified.

CHARLES A. RAGGIO.

Witnesses:
WM. ZIMMERMAN,
L. W. BENDER.